(12) United States Patent
Miller et al.

(10) Patent No.: US 6,189,807 B1
(45) Date of Patent: Feb. 20, 2001

(54) VALVE CONTROLLED SPRAYING SYSTEM

(75) Inventors: Fred A. Miller, Elburn; Randal S. Aspen, Oswego, both of IL (US)

(73) Assignee: Spraying Systems Co., Wheaton, IL (US)

( * ) Notice: Under 35 U.S.C. 154(b), the term of this patent shall be extended for 0 days.

(21) Appl. No.: 09/515,234

(22) Filed: Feb. 29, 2000

Related U.S. Application Data

(63) Continuation-in-part of application No. 09/052,666, filed on Mar. 31, 1998, now Pat. No. 6,036,107.

(51) Int. Cl.$^7$ ................................. B05B 9/00; B05B 1/30
(52) U.S. Cl. ....................... 239/124; 239/170; 239/581.1; 137/625.22
(58) Field of Search ..................... 239/124, 170, 239/569, 581.1; 137/625.21, 625.22, 625.23; 251/315.01, 315.16

(56) References Cited

U.S. PATENT DOCUMENTS

| | | |
|---|---|---|
| 2,081,022 | 5/1937 | Smith . |
| 2,263,913 * | 11/1941 | Bargeboer ............................ 239/124 |
| 2,834,368 | 5/1958 | Gray . |
| 3,234,964 | 2/1966 | Tinsley et al. . |
| 3,464,449 | 9/1969 | Morton . |
| 3,674,052 | 7/1972 | Hartman et al. . |
| 3,684,241 * | 8/1972 | Hartmann et al. .......... 137/625.22 X |
| 3,784,100 * | 1/1974 | Kirschmann ..................... 239/569 X |
| 4,099,543 | 7/1978 | Mong et al. . |
| 4,252,274 | 2/1981 | Kubacak . |
| 4,460,127 | 7/1984 | Hofmann . |
| 4,548,237 | 10/1985 | Bogenschutz . |
| 4,660,598 | 4/1987 | Butterfield et al. . |
| 4,723,710 | 2/1988 | Lucore, II . |
| 4,741,361 | 5/1988 | McHugh . |
| 4,784,295 | 11/1988 | Holmstrand . |
| 5,148,839 * | 9/1992 | Kirwan et al. .............. 137/625.22 X |
| 5,205,520 | 4/1993 | Walker . |
| 5,294,156 | 3/1994 | Kumazaki et al. . |
| 5,351,887 | 10/1994 | Heterington et al. . |
| 5,354,101 | 10/1994 | Anderson, Jr. . |
| 5,360,036 | 11/1994 | Kieper . |
| 5,388,606 | 2/1995 | Banks . |
| 5,433,380 | 7/1995 | Hahn . |
| 5,529,088 | 6/1996 | Asou . |
| 5,699,834 | 12/1997 | Hayashi et al. . |
| 5,881,773 | 5/1999 | Lukas et al. . |

FOREIGN PATENT DOCUMENTS 0 820 224 B1    1/1998   (EP) .

* cited by examiner

Primary Examiner—Andres Kashnikow
Assistant Examiner—Robin O. Evans
(74) Attorney, Agent, or Firm—Leydig, Voit & Mayer, Ltd.

(57) ABSTRACT

A spraying system having a control valve with an inlet port for connection to a liquid supply, a discharge port for connection to a spray nozzle, and a return port for connection to the liquid supply. The control valve includes a valve member which has a liquid flow passageway and is movable between an open position in which the liquid flow passageway communicates between the inlet and discharge ports for permitting the direction of pressurized liquid to the spray nozzle and a second position which prevents the flow of pressurized liquid to the discharge port. The spray nozzle has an associated pressure responsive check valve for preventing the flow of liquid to the spray nozzle, and hence for preventing drippage, upon movement of the control valve member to the off position. To accelerate actuation of the check valve, and hence, minimize undesired drippage and dribbling from the spray nozzle, the control valve member is formed with a relief passage separate from the liquid flow passage which upon movement of the control valve member to the off position communicates between the discharge and return ports for bleeding liquid downstream of the control valve to the return port and more rapidly lowering downstream line pressure and actuating the check valve.

19 Claims, 4 Drawing Sheets

VALVE CONTROLLED SPRAYING SYSTEM

This application is a continuation-in-part of U.S. application Ser. No. 09/052,666 filed Mar. 31, 1998 now U.S. Pat. No. 6,036,107.

FIELD OF THE INVENTION

The present invention relates generally to valve controlled spraying systems, and more particularly, to rotary or ball-valve controlled spraying systems

BACKGROUND OF THE INVENTION

Agricultural sprayers typically have long spray booms with groups of spray nozzles that are selectively controlled by respective control valves, each of which is individually actuated to permit transmission or termination of liquid to the spray nozzles of the group. Termination of liquid to one or more groups of spray nozzles frequently is necessary, for example, near the ends of fields so as to prevent spraying on non-crop vegetation or the like. The control valves for such spraying systems commonly are mounted in ganged or manifolded side-by-side relationship with respect to each other and remote from the spray nozzles they control. Each control valve is provided with a valve element that is movable between open and closed positions to selectively control the flow of liquid to the spray nozzles of the respective group.

A problem associated with such agricultural sprayers is the tendency for fluid to drip or dribble from the nozzles after the supply of pressurized fluid has been shut off by the control valve. In an effort to prevent such drippage, each spray nozzle may be provided with a respective spring-actuated check valve, as shown in commonly assigned U.S. Pat. No. 4,660,598. Following movement of the control valve to a closed position and the ultimate reduction of line pressure to a level below the check valve spring pressure, the check valve will snap closed to prevent further liquid from entering the spray nozzle. If the nozzle discharge orifice is relatively large, following closure of the control valve, line pressure downstream of the control valve will quickly drop below the check valve spring pressure by reason of relatively quick run out through the nozzle. If the discharge orifice is small, and particularly at high line pressures, it can take a considerable time, following movement of the control valve to a closed position, before the line pressure reduces to a level that permits the check valve to close. In either case undesirable dripping and dribbling can occur. Since spray booms can carry 60 or more nozzles, this can result in costly waste of chemicals, the over concentrated application of chemicals, and the direction of chemical to unwanted areas. While proposals have been made for more quickly shutting off such check valves following movement of the control valve to a closed position, such as by use of air pressure or other auxiliary check valve moving means, those proposals have been relatively complex and expensive.

OBJECTS AND SUMMARY OF THE INVENTION

It is an object of the present invention to provide a valve controlled spraying system having spray nozzle check valves that more quickly shut off the flow of liquid to the spray nozzles following closure of the spraying systems control valve, and hence, more effectively prevent undesirable drippage, waste, and unintended application of liquid chemicals.

Another object is to provide a valve controlled spraying system as characterized above which is operable, without the need for costly pressurized air or other auxiliary check valve closing means.

A further object is to provide a valve controlled spraying system of the above kind in which the control valve is adapted for more quickly relieving line pressure downstream of the control valve upon movement of the control valve to a closed position, and as an incident thereto, bleed liquid back to the liquid supply, rather than through the spray nozzles.

Still another object is to provide a spraying systems control valve which is relatively simple in construction and lends itself to economical manufacture. A related object is to provide a rotary valve member for such a spraying systems control valve which can be easily and economically retrofit into relatively complex manifold mounted control valve arrangements.

Other objects and advantages of the invention will become apparent upon reading the following detailed description and upon reference to the drawings, in which:

Figure 1:
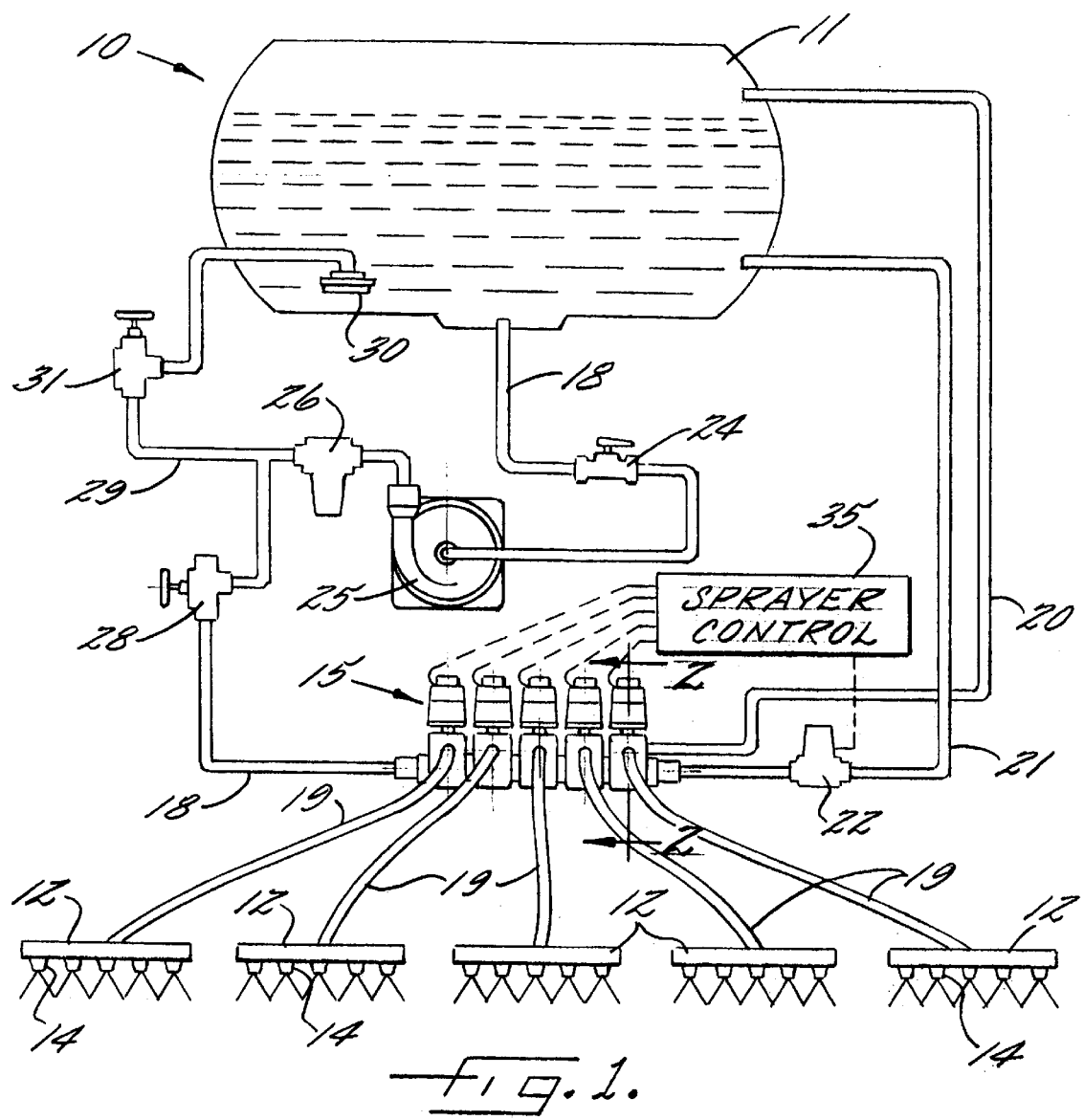
FIG. 1 is a schematic diagram of an illustrative spraying system having control valves in accordance with the present invention.

While the invention is susceptible to various modifications and alternative constructions, certain illustrated embodiments thereof have been shown in the drawings and will be described in detail below. It should be understood, however, that there is no intention to limit the present invention to the disclosed structural forms. On the contrary, the intention is to cover all modifications, alternative constructions, and equivalents that fall within the spirit and scope of the invention. Hence, while the present invention will be described in connection with gang mounted control valves for an agricultural spraying system, it will be understood that the invention is equally applicable to individual control valves for other types of liquid spraying or transfer systems.

DETAILED DESCRIPTION OF THE PREFERRED EMBODIMENTS

Referring now more particularly to FIG. 1 of the drawings, there is shown an illustrative agricultural spraying system 10 which includes a supply tank 11 for containing a quantity of liquid to be sprayed, a plurality of spray sections 12 each having a plurality of spray nozzles 14 through which liquid is discharged, and a group of spray control valves 15 in accordance with the invention which are mounted in a ganged or manifolded side-by-side relationship with respect to each other and are adapted to control the flow of liquid from the supply tank 11 to the spray sections 12. Basically, the spraying system 10 is similar to that disclosed in the above referenced U.S. application Ser. No. 09/052,666, the disclosure of which is incorporated herein by reference.

As is customary in agricultural sprayers, the spraying system 10 includes a supply line 18 between the supply tank 11 and the group of control valves 15 for transmitting liquid to the control valves 15, a discharge line 19 between each control valve 15 and a respective spray section 12 for delivering liquid to the spray section 12, a return line 20 that provides return communication between the control valves 15 and the supply tank 11, and a regulation line 21 having a regulation valve 22 between the group of control valves 15 and the supply tank 11 for facilitating regulation of the system pressure.

The supply line 18 of the illustrated spraying system 10 includes a shutoff valve 24 which permits manual flow stoppage of liquid from the supply tank 11, a pump 25 which pressurizes liquid in the supply line 18, a strainer 26 for filtering debris from the supply line 18, and a throttling valve 28 which permits manual regulation of flow. The supply line 18 also includes a return line 29 which, in this case, branches off from the supply line 18 at a point downstream of the pump 25 and returns to the supply tank 11. As shown in FIG. 1, this return line 29 includes an agitator 30 located within the supply tank 11 which mixes the liquid within the supply tank 11 based upon the flow rate through the return line 29. A throttling valve 31 also is provided in the return line 20 which may be manually adjusted to regulate the flow rate through the return line 20 and to adjust the mixing rate of the agitator 30. The illustrated spraying system 10 is provided with a computer operated sprayer control 35 which is operatively connected to each of the control valves 15 of the group and the regulating valve 22, in a known manner.

Figure 2:
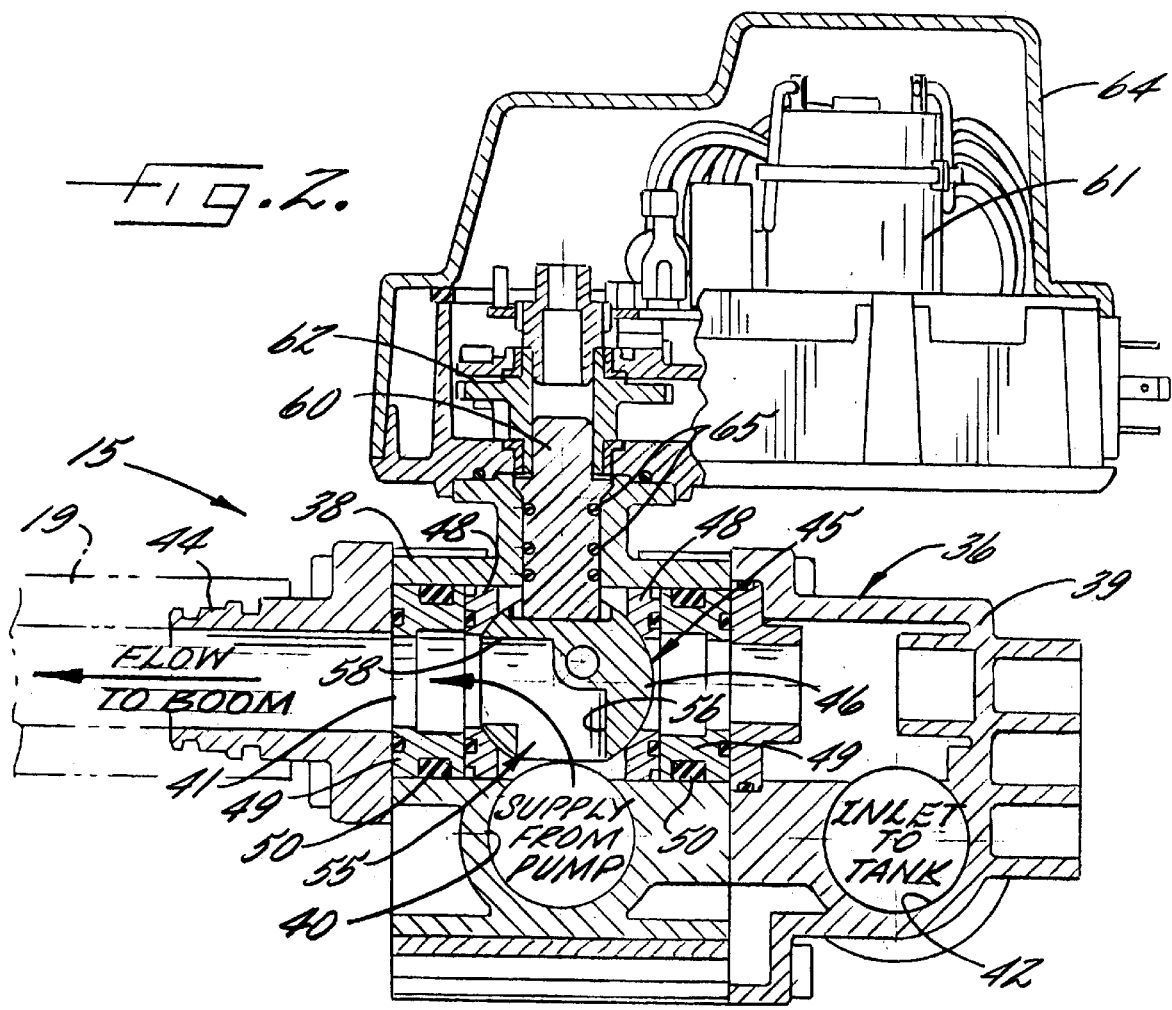
FIG. 2 is an enlarged fragmentary section of one of the control valves included in the spraying system shown in FIG. 1, showing the rotary valve member thereof in an open position.
Figure 3:
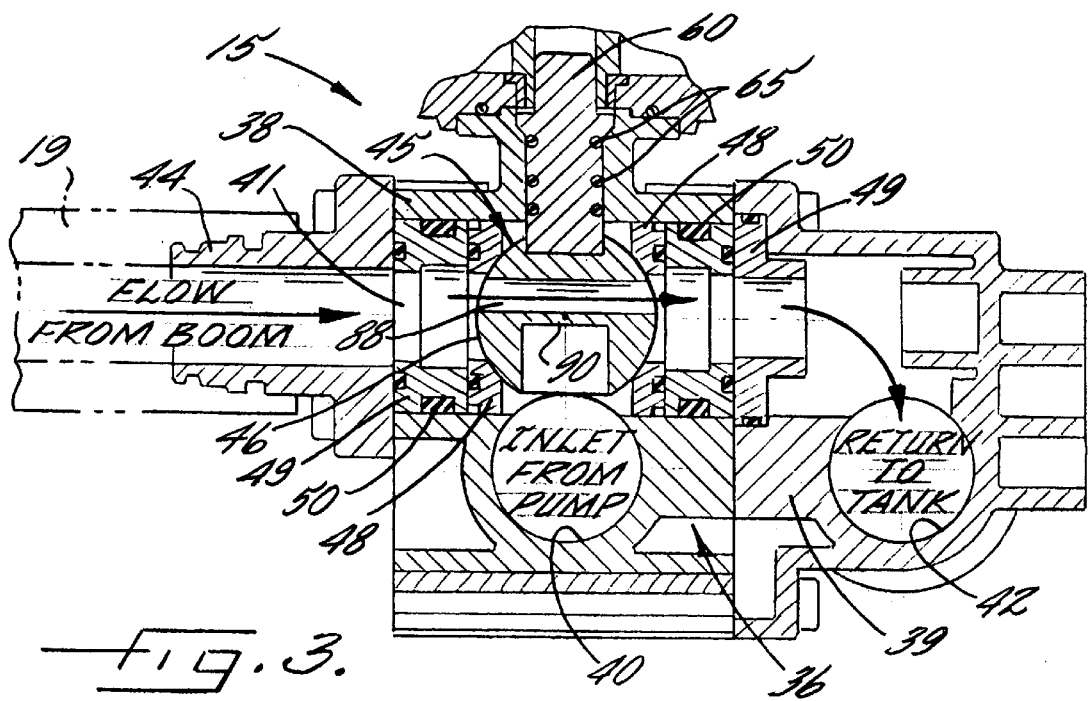
FIG. 3 is a fragmentary section of the control valve shown in FIG. 2, showing the rotary valve member in an off position.

The control valves 15 have a modular construction and are mounted in ganged or manifold relation in a manner similar to that disclosed in the above referenced application. The control valves 15, as shown in FIGS. 2 and 3, each have a housing or body 36 having a front section 38 and a separate rear section 39. The front section 38 of each housing 36 defines both a supply port 40 and a transverse discharge port 41, while the rear section 39 defines a return port 42. The control valve housings 36 are mounted in ganged relation with the supply ports 40 of the plurality of control valves 15 communicating with each other and with the liquid supply line 18 and the return ports 42 of the control valves 15 communicating with each other and the return line 20. To provide suitable connection between the discharge ports 41 of each control valve 15 and a respective discharge line 19, a discharge port adapter 44 is mounted to the front section 38 of each control valve 15.

In order to selectively control the flow from the supply port 40 to the discharge port 41, a rotatable ball valve assembly 45 is provided within the housing 36 of each valve 15. The ball valve assembly 45 includes a generally spherical valve member 46 which is positioned within the front section 38 of the housing 36 at the junction of the supply port 40 and the discharge port 41 and is rotatably supported above the supply port 40 by annular seals 48 on opposite front and rear sides thereof. The seals 48 in this case each are retained in sealed relation by a respective spacer 49 which each further has a respective O-ring seal 50. The illustrated spherical valve member 46 has a two way flow passage 55 formed therein which includes a downwardly projecting, generally vertical passage segment 56 and a generally horizontal passage segment 58. More specifically, the first passage segment 56 communicates with the supply port 40 and the second passage segment 58 is arranged substantially perpendicular to the first passage segment 56 for selective communication with the discharge port 41.

To selectively rotate the ball valve assembly 45 for either directing flow from the supply port 40 to the discharge port 41 or for blocking the flow of liquid from the supply port 40 to the discharge port 41, a stem 60 is affixed to the top of the spherical valve member 46 and projects outwardly from the top of the front housing portion 38. The stem 60 is operatively connected to a motor 61 having a gear train assembly 62, which are collectively encased within a protective cover 64. A plurality of O-ring seals 65 are provided between the stem 60 and housing section 38.

In operation, the motor 61 and gear train assembly 62 are operable to selectively rotate the spherical member of the ball valve member 46 through an angle of 90 degrees between a first operating or open position, as shown in FIG. 2, and a second operating or closed position, as shown in FIG. 3. In the first operating position, the second passage segment 58 of the spherical member 46 communicates with the discharge port 41 of the housing to permit the flow of liquid from the supply port 40 to the discharge port 41. In the second operating or closed position, the spherical member 46 is rotated 90 degrees such that the second passage segment 58 is moved to a position adjacent a side wall of the front housing section 38, which blocks the flow of liquid from the supply port 40 through the valve member 46, and hence, prevents the flow of liquid to the discharge port 41. Conversely, 90 degree reverse rotation of the spherical valve member 46 will relocate the second passage segment 58 with the discharge port 41 so as to permit the flow of liquid from the inlet line 18 and through the inlet port 40, discharge port 41, and discharge line 19 to the respective spray section 12 for delivery through the plurality of spray nozzles 14 of the section 12, as shown in FIG. 2.

Each spray nozzle 14 in this case has a nozzle body 68 with a stem 69 supported in fluid communication with a liquid supply boom 70 of the spray section 12, which in turn is coupled to a respective supply line 19. The spray nozzle 14 may be of a conventional type, such as shown in commonly assigned U.S. Pat. No. 4,660,598, the disclosure of which is incorporated by reference. Liquid directed into the nozzle body 68 via an inlet port 71 is directed into a longitudinal flow stream by a cylindrical tube 74. The tube 74 is co-axially disposed in inwardly spaced relation from an internal cylindrical wall of the nozzle body 68 with its downstream end 72 connected to the body 68. Liquid entering the upstream end 73 of the tube 74 is directed axially downstream, through a strainer 75, and ultimately through a spray tip 76 secured at the downstream end of the body 68 by a retaining cap 78.

Figure 6:
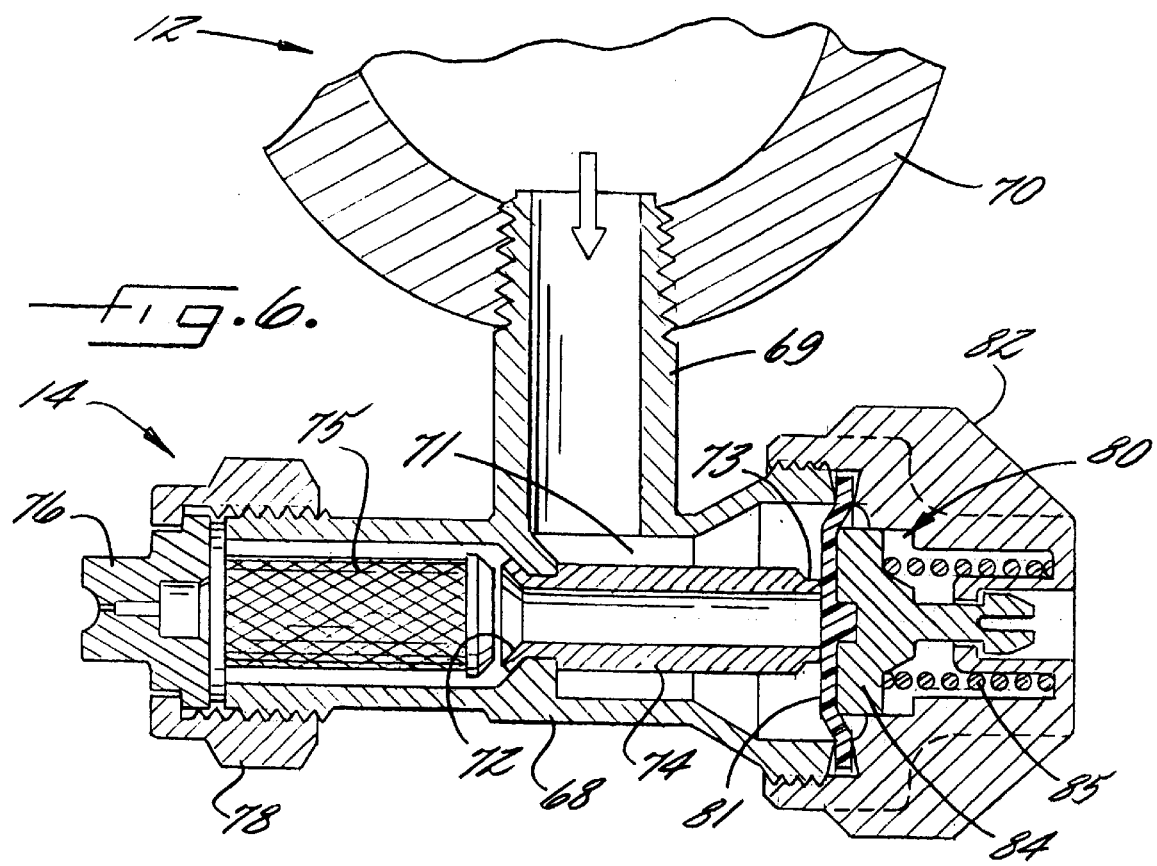
FIG. 6 is an enlarged fragmentary section of one of the spray nozzle assemblies and its associated check valve included in the spraying system shown in FIG. 1, showing the check valve in a closed position.
Figure 7:
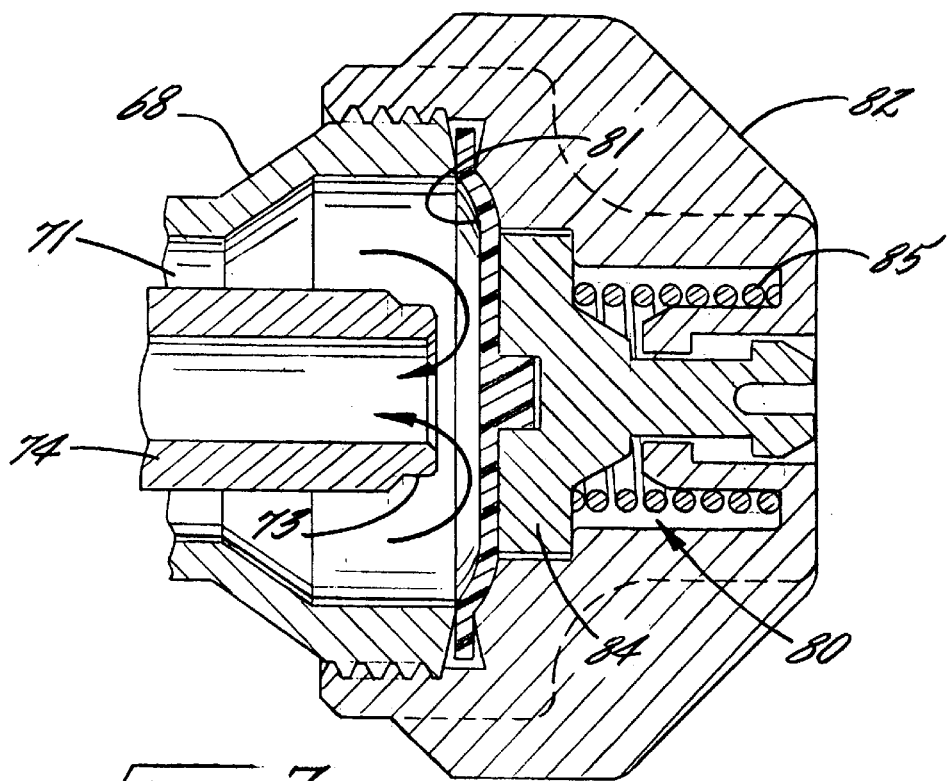
FIG. 7 is an enlarged fragmentary section of the illustrated check valve, showing the check valve in an open position.

For preventing liquid from dripping from the spray tip 76 after the supply of pressurized liquid to the nozzle has been cut off, such as upon rotation of the ball valve member 46 to its closed position, a spring operated check valve 80 (FIG. 6) is provided on the upstream end of the nozzle 14, consistent with the disclosure of the above-referenced U.S. Pat. No. 4,660,598. The check valve 80 includes a flexible diaphragm 81 located adjacent the upstream end 73 of the flow tube 74 with its peripheral edge clamped between the end of a nozzle body 68 and a cap 82 threaded onto the end of the body 68. A valve follower 84 is slidably supported within the cap 82 in engaging relation with the diaphragm 81 for urging the diaphragm 81 toward a closed position against the upstream end 73 of the tube 74 under the biasing force of a spring 85. When the pressure of liquid delivered to the nozzle body via the supply line 19 exceeds the force of the spring 85, the pressurized liquid urges the diaphragm 81 away from the upstream end 73 of the tube 74, as shown in FIG. 7, so as to enable the liquid to flow through the tube 74 and be discharged from the spray tip 76. Upon shutting off of pressurized liquid from the supply source, such as when the ball valve member 46 is rotated to its second or closed position, the spring 85 forces the diaphragm into sealing engagement with the upstream end of the tube 74 so as to prevent further liquid from discharging or dripping from the spray tip 76.

As indicated previously, if the discharge orifice of the spray tip is relatively large, following movement of the control valve member to a closed position, liquid downstream of the control valve will quickly drain from the spray tip and line pressure will quickly fall below the level of the check valve spring pressure, resulting in relatively prompt closure of the check valve. If the discharge orifice of the spray tip is small, heretofore it can take an appreciable period of time following movement of the control valve member to a closed position before the line pressure is reduced to a level that enables the check valve to close. In either case, at least some additional dripping or dribbling occurs from the spray tip, which can result in the costly waste of chemicals or the application of chemicals to unwanted areas.

In accordance with the invention, the rotary control valve member is formed with a relief passageway separate and apart from the main liquid flow passage through the valve member, which upon movement of the control valve to a closed position, facilitates quicker shut off of the spray nozzle check valves for more effectively preventing undesired drippage. To this end, the rotary ball valve member 46 is formed with a relief passageway 88 separate from the liquid flow passageway 55 defined by the first and second passageway segments 56, 58, which upon movement of the rotary valve member 46 to a closed position communicates between the discharge port 41 and the return port 42 for more quickly bleeding off liquid in the line 19 downstream of the control valve 15, and hence, more quickly reducing pressure in the liquid supply line 19 and closure of the spray nozzle check valve 80.

Figures 4, 5:
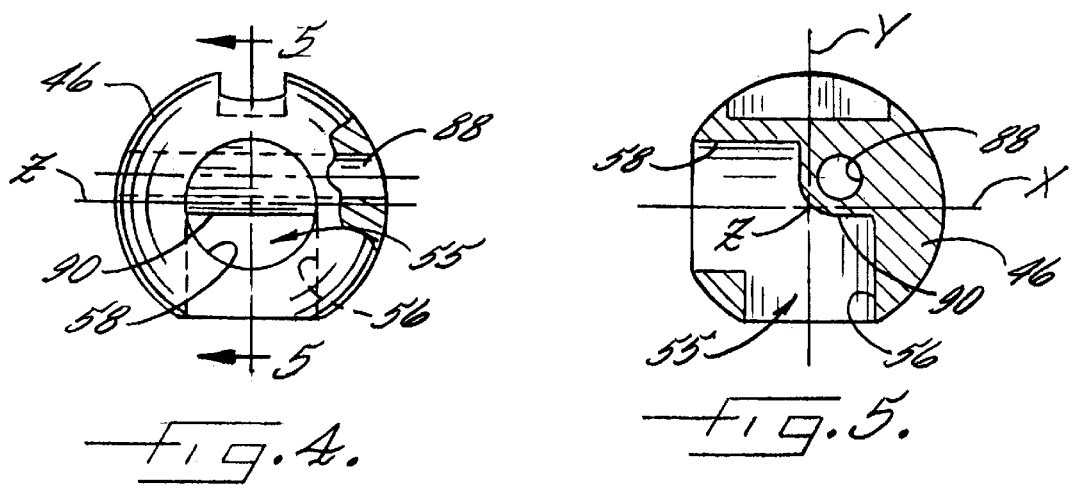
FIG. 4 is an enlarged side elevational view of the spherical valve member of the control valve shown in FIG. 3.
FIG. 5 is a vertical section of illustrated valve member taken in the plane of 5—5 in FIG. 4.

The illustrated relief passage 88, as illustrated in FIGS. 4 and 5, is formed through a quadrant of the spherical valve member 46 at a location separated from the first and second passage segments 56,58 and extends along an axis parallel to a Z axis of the ball valve member, and hence, perpendicular to Y and X axes of the relatively perpendicular first and second passage segments 56, 58, respectively. In this case, the first and second passage segments 56, 58 are interconnected by a curved wall section 90 which extends substantially through the Z axis of the ball valve member 46 and has a center of curvature substantially co-axial with the axis of the relief passageway 88. One skilled in the art will appreciate that the curved wall section 90 will not significantly impede passage of the liquid flow stream through the first and second passage segments 56, 58, while at the same time, it enables the relief passageway 88 to be located sufficiently close to the Z axis of the ball valve member 46 such that when the ball valve member 46 is rotated to a closed position, as shown in FIG. 3, the relief passage 88 is disposed within the sealed areas defined by the annular seals 48 in communicating relation between the discharge and return ports 41, 42. The relief passageway 88 preferably is significantly smaller in diameter than the main liquid flow passage segments 56, 58, while being significantly larger than the spray tip discharge orifices. In the illustrated embodiment, the relief passage 88 is less than half the diameters of the main liquid flow passage segments 56, 58, while being at least twice, and preferably more than four times greater than the size of the spray tip discharge orifice.

Hence, when the rotary ball valve member 46 is rotated to its second or closed position with the relief passage 88 communicating between the discharge and return ports 41,42 pressurized liquid in the discharge line 19 will quickly bleed through the relief passage 88 to the return line 20, resulting in the rapid drop in line pressure, and hence, rapid actuation of the spray nozzle check valve 80. Moreover, since the liquid in the discharge line 19 will primarily bleed through the relatively larger diameter relief passage 88, it will be directed via the return line 20 back to the liquid supply 11 for reuse. Hence, the control valve 15 not only minimizes undesirable drippage from the spray tip 76, but substantially eliminates costly waste.

Figure 8:
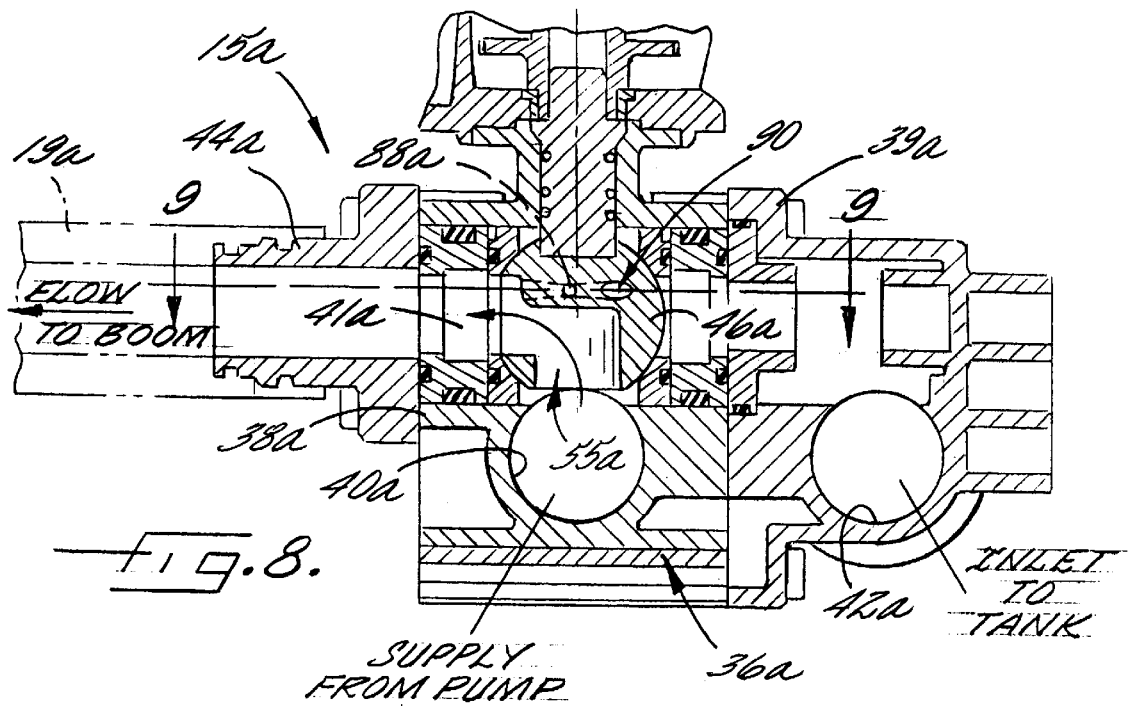
FIG. 8 is a vertical section of a control valve having an alternative form of spherical rotary valve member.
Figure 9:
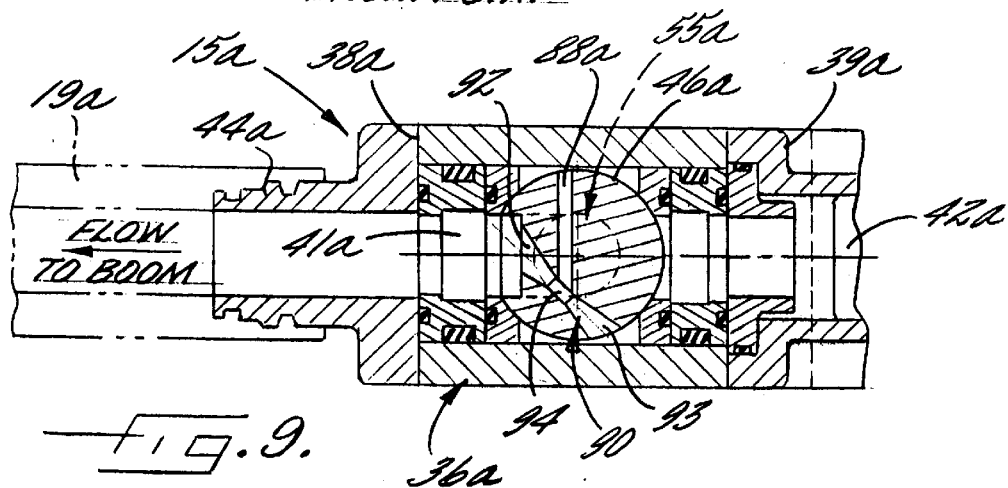
FIG. 9 is a fragmentary horizontal section of the control valve taken in the plane of 9—9 in FIG. 8, showing the ball valve in an on position.
Figure 10:
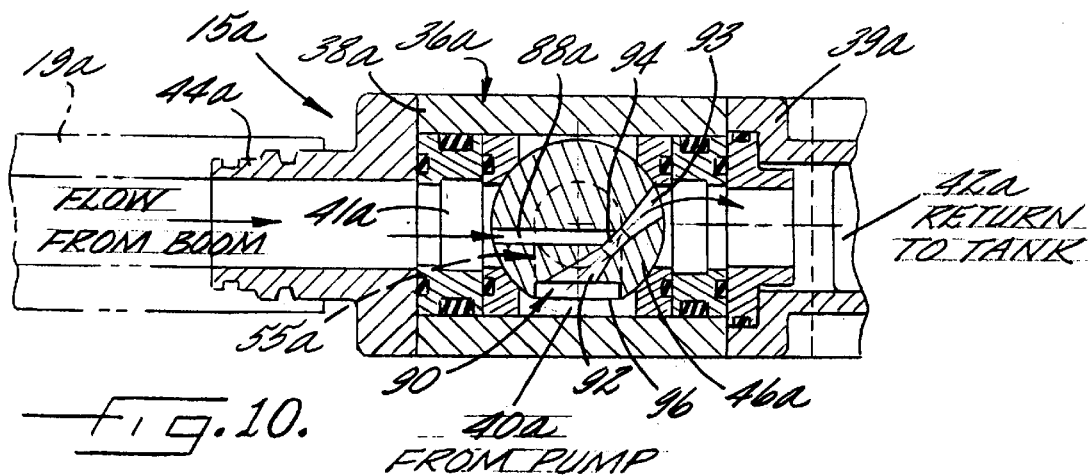
FIG. 10 is a fragmentary horizontal section, similar to FIG. 9, showing the ball valve in an off position.

Referring now to FIGS. 8–10, there is shown an alternative embodiment of a control valve according to the invention in which items similar to those described above have been given similar reference numerals with the distinguishing suffix "a" added. The control valve 15a includes a body 36a having front and rear sections 38a, 39a, respectively, which define a liquid inlet port 40a, a discharge port 41a, and a return port 42a, identical to those described above. The control valve 15a further includes a rotatable ball valve member 46a having a liquid flow passage 55a which is rotatable between a first or on position, as shown in FIGS. 8 and 9, permitting communication between the inlet and discharge ports 40, 41a and a second or closed position. The ball valve member 46a has a relief passage 88a, which in FIGS. 8 and 9 is in an inoperative position.

In carrying out a further feature of the invention, the ball valve member 46a is formed with a venturi passage 90 in intersecting relation to the relief passage 88a which, as an incident to rotation of the ball valve member 46a to the second or closed position, communicates between the liquid inlet port 40a, as depicted in FIG. 10, and the return port 42a for creating a low pressure zone within the relief passage 88a effective for positively drawing liquid from the discharge line 19a through the relief passage 88a to the return port 42a. In the illustrated embodiment, the venturi passage 90 is oriented at an acute angle, such as about 45 degrees, to the relief passageway 88a and includes an inwardly tapered inlet section 92, an outwardly opening discharge section 93, and a reduced diameter venturi section 94. The reduced diameter venturi section 94 in this case has a diameter corresponding substantially to the diameter of the relief passageway 88a. The illustrated ball valve member 46a is formed with a flat 96 to provide downward communication between the venturi passage inlet section 92 and the inlet port 40a when the ball valve member 46a is in the second or closed position, as shown in FIG. 10.

When the ball valve 46a is in its first or open position with the main liquid flow passageway communicating between the inlet port 40a and the discharge port 41a, the relief and return venturi passages 88a and 90 are closed off transversely between sidewalls of the front body section 36a. When the ball valve member 46a is rotated to its second or closed position, the upstream end of the relief passageway 88a communicates with the discharge port 41 a, the inlet section 92 of the venturi passage 90 communicates with the inlet port 40a, and the discharge section 93 of the venturi passage 90 communicates with the return port 42a. Hence, not only will liquid bleed from the discharge line 19a into the relief passage 88a, but pressurized liquid directed to the inlet port 40a will communicate through the venturi passage 90 to the return port 42a, creating a low pressure zone in the reduced diameter section 94 of the venturi passage 90, to positively draw liquid through the relief passage 88a from the discharge line 19a, to accelerate the reduction of line pressure in the discharge line 19a, and hence, accelerate closure of the spray nozzle check valves 80. Because liquid from the inlet port 40a through the venturi passage 90 is directed to the return line 20, and hence the liquid supply 11 for the spraying system, the return line 20 effectively serves as a bypass line for the liquid during periods in which the ball valve member 46a is in a closed position, hence, enabling continuous recirculation of liquid between the liquid supply 11 and the control valve 15a.

From the foregoing, it will be seen that the valve controlled spray system of the present invention has spray nozzle check valves that more quickly shut off the flow of liquid to the spray nozzles following closure of the spraying systems control valve, and hence, more effectively prevent undesirable leakage, waste, and unintended application of liquid chemicals. The valve control spraying system, furthermore, is operable without the need for costly pressurized air or other auxiliary check valve closing means. It will be further appreciated by one skilled in the art that the rotary valve member of the control valves are relatively simple in construction and lend themselves to economical manufacture. Moreover, the rotary ball valve member can be easily retrofitted into existing control valve systems for achieving the advantages of the invention.

What is claimed is:

1. A spraying systems comprising
   at least one spray nozzle having a discharge orifice for directing a liquid spray;
   a control valve having a housing;
   said housing having an inlet port, a discharge port, and a return port,
   a first liquid supply line for connection between said inlet port and said liquid supply whereby a pressurized liquid flow stream may be directed to said inlet port;
   a return line for connection between said return port and said liquid supply;
   a second liquid supply line for connection between said discharge port and said spray nozzle;
   said control valve having a movable valve member supported within said housing;
   said valve member having a liquid flow passage and being movable in said housing between a first position in which said liquid flow passage communicates between said inlet and discharge ports for permitting the direction of pressurized liquid to said second supply line and said spray nozzle and a second position in which said control valve member prevents the flow of pressurized liquid to said discharge port, said second supply line, and said spray nozzle;
   said spray nozzle having an associated check valve that is closeable for preventing the flow of liquid to said spray nozzle in response to liquid pressure in said second supply line falling below a predetermined level;
   and said control valve member having a relief passage separate from said liquid flow passage and which upon movement of said control valve member to said second position communicates between said discharge and return ports for bleeding liquid from said second supply line through said discharge port to said return port for rapidly lowering pressure in said second supply line and rapidly closing the check valve associated with the spray nozzle.

2. The spraying system of claim 1 in which said control valve member liquid flow passage has a first passage segment communicating with said inlet port and a second passage segment communicating with said discharge port when said valve member is moved to said first position.

3. The spraying system of claim 2 in which said second passage segment is at a right angle to said first passage segment.

4. The spraying system of claim 3 in which said first and second passage segments extend along axes that are perpendicular to each other, and said relief passage extends along an axis that is perpendicular to the axes of said first and second passage segments.

5. The spraying system of claim 1 in which said valve member is rotatable between said first and second positions.

6. The spraying system of claim 5 in which said valve member has a spherical ball shape end rotably supported in said housing.

7. The spraying system of claim 1 in which said control valve housing has a first section which defines said inlet and discharge ports, and a second section which defines said return port, and said valve member is mounted within said first housing section between said inlet and discharge ports.

8. The spraying system of claim 1 in which said relief passage has a diameter of less than one half the diameter of said liquid flow passage.

9. The spraying system of claim 8 in which said relief passage has an effective flow area greater than the flow area of the spray nozzle discharge orifice.

10. The spray nozzle assembly of claim 9 in which said relief passage defines a flow area that is at least four times greater than the flow area of the discharge orifice.

11. The spraying system of claim 1 including a pair of annular seals disposed on opposed sides of said valve member, one of said annular seals defining a sealed area in communication with said discharge port and one of said annular seal defining a sealed area in communication with said return port, and said valve member relief passage communicates between said sealed areas when said valve member is in said second position.

12. The spraying system of claim 1 in which said valve member is formed with a venturi passage which extends through said valve member in intersecting relation to said relief passage, said venturi passage having an inlet section communicating with said inlet port when said valve member is in said second position for communicating liquid from said inlet port to said return port to create a low pressure zone in said relief passage for positively drawing liquid from said discharge port through said relief passage to said return port.

13. The spraying system of claim 12 in which said venturi passage inlet port has an enlarged inlet section and a reduced diameter venturi section, said venturi section being located in intersecting relation with said relief passage.

14. The spraying system of claim 13 in which said relief and venturi passages jointly communicate with said return port.

15. The spraying system of claim 1 in which said spray nozzle includes a stem having a downstream end in fluid communication with the spray nozzle discharge orifice and an upstream inlet end, said check valve including a diaphragm mounted adjacent the upstream inlet end of said stem, said diaphragm having a face exposed to liquid pressure in said second supply line, and a biasing member for urging the diaphragm against said stem to prevent the flow of liquid from said second supply line to said stem when a liquid pressure induced force against said diaphragm face falls below the force of said biasing member.

16. A spraying systems comprising
   a liquid supply boom defining a liquid flow passage and supporting a plurality of spray nozzles which each have a discharge orifice in fluid communication with the liquid flow passage;
   a control valve having a housing;
   said housing having an inlet port, a discharge port, and a return port,
   a first liquid supply line for connection between said inlet port and said liquid supply whereby a pressurized liquid flow stream may be directed to said inlet port;
   a return line for connection with said return port;
   a second liquid supply line for connection between said discharge port and said liquid supply boom;
   said control valve having a movable valve member supported within said housing;
   said valve member having a liquid flow passage and being movable in said housing between a first position in which said valve member liquid flow passage communicates between said inlet and discharge ports for permitting the direction of pressurized liquid to said second supply line and said boom and a second position in which said control valve member prevents the flow of pressurized liquid to said discharge port, said second supply line, and said liquid supply boom;
   said spray nozzles each having an associated check valve which is closeable for preventing the flow of liquid to the spray nozzle in response to liquid pressure in said second supply line and boom falling below a predetermined level; and
   said control valve member having a relief passage separate from said liquid flow passage and which upon movement of said control valve member to said second position communicates between said discharge and return ports for bleeding liquid from said second supply line through said discharge port to said return port for rapidly lowering pressure in said second supply line and boom and rapidly closing the check valves associated with said spray nozzle.

17. The spraying system of claim 16 in which said control valve member liquid flow passage has a first passage segment communicating with said inlet port and a second passage segment communicating with said discharge port when said valve member is moved to said first position, said spray nozzles each including a stem having a downstream end in fluid communication with the spray nozzle discharge orifice and an upstream inlet end, said associated check valves each including a diaphragm mounted adjacent the upstream inlet end of the spray nozzle stem, said diaphragm having a face exposed to liquid pressure in said second nozzle supply line and boom, and a biasing member for urging the diaphragm against said stem to prevent the flow of liquid from said boom to the stem when a liquid pressure induced force against said diaphragm face falls below the force of the biasing member.

18. The spraying system of claim 16 in which said relief passage has a diameter of less than one half the diameter of said liquid flow passage, and said relief passage has an effective flow area greater than the flow area of each spray nozzle discharge orifice.

19. A spraying systems comprising
   a plurality of liquid supply booms each having a flow passage and supporting a plurality of spray nozzles, said spray nozzles each having a discharge orifice in fluid communication with the respective boom flow passage, a plurality of control valves, each being associated with a respective one of said liquid supply booms and having a respective housing, each said housing having an inlet port, a discharge port, and a return port, said housings being mounted in side by side relation to each other with said inlet ports in fluid communication with each other and said return ports in fluid communication with each other, a first liquid supply line for connection between a liquid supply and an inlet port of at least one of said control valves whereby a pressurized liquid flow stream may be directed to said control valve inlet ports, a return line for connection between the return port of at least one of said control valves and said liquid supply, control valve each having a second liquid supply line connected between the discharge port of the control valve and the respective liquid supply boom, said control valve each having a movable valve member supported within said housing, said valve member of each control valve having a liquid flow passage and be movable in the housing between a first position in which said valve member liquid flow passage communicates between the inlet and discharge ports of the housing for permitting the direction of pressurized liquid from said inlet port to the second supply line connected to the control valve discharge port and to the respective liquid supply boom and a second position in which said control valve member prevents the flow of pressurized liquid to the discharge port and second supply line connected to the control valve discharge port, said spray nozzles each having an associated check valve which is closeable for preventing the flow of liquid to the respective spray nozzle in response to liquid pressure in the liquid supply boom upon which it is mounted falling below a predetermined level, and each said control valve member having a relief passage separate from said valve member liquid flow passage and which upon movement of the control valve member to said second position communicates between the discharge and return ports of the control valve for bleeding liquid from the respective second supply line through the discharge port to said return port of the control valve for more rapidly lowering pressure in the respective second supply line and liquid supply boom and rapidly closing the check valve associated with the spray nozzle.

* * * * *